UNITED STATES PATENT OFFICE.

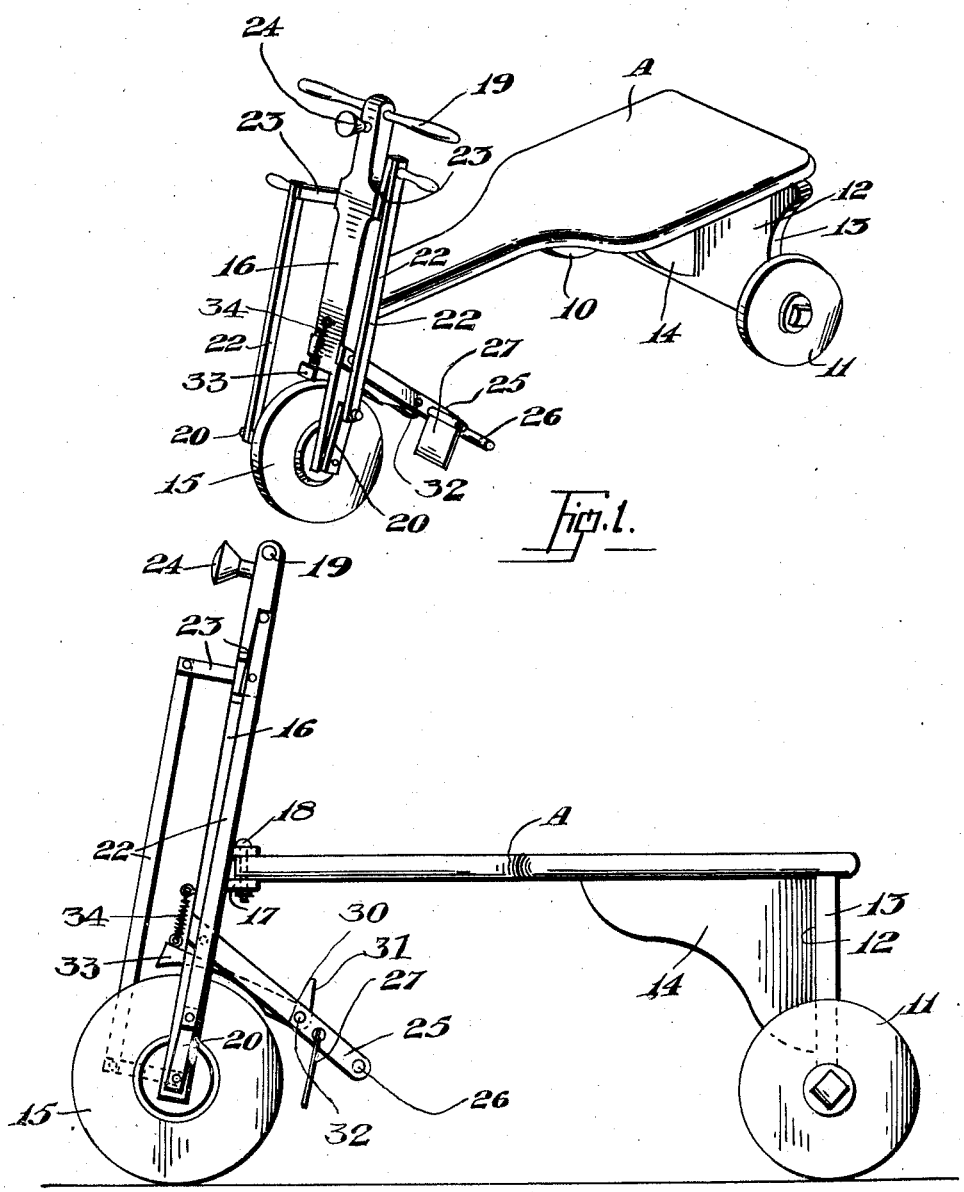

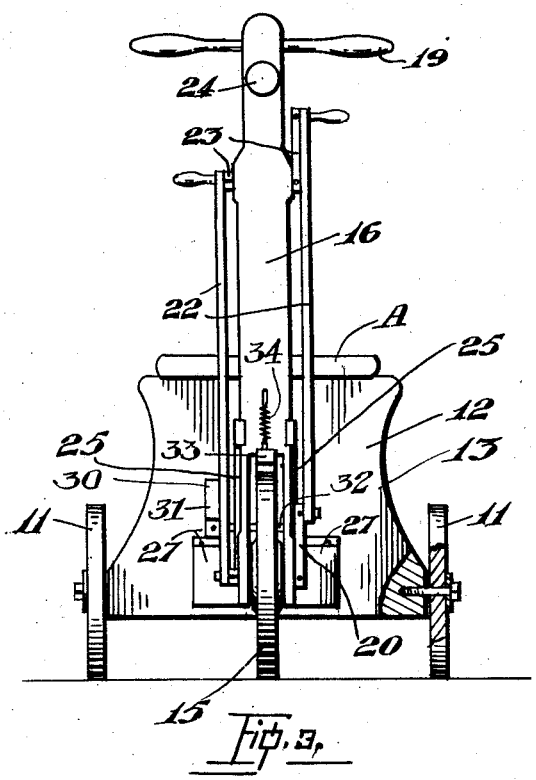
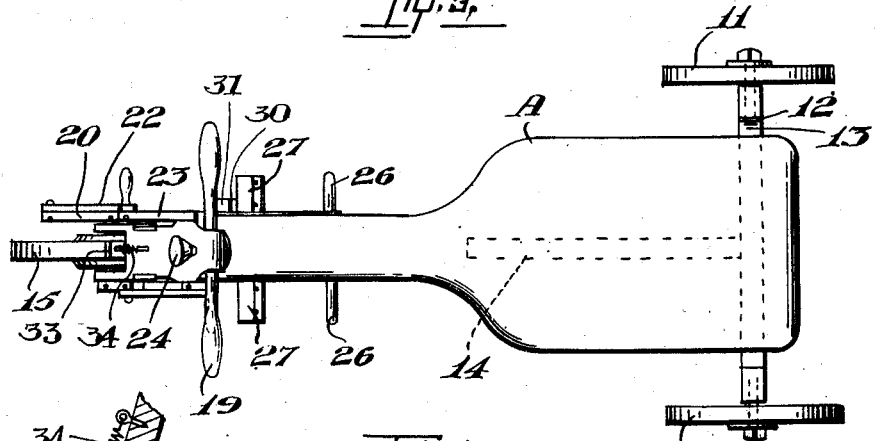
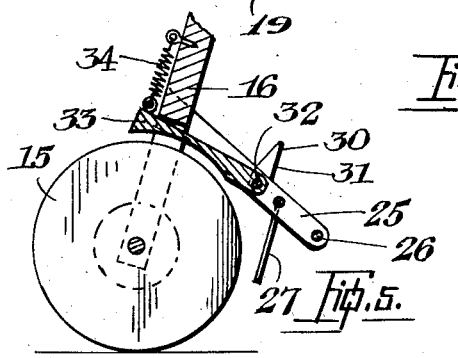

JOHN DITTRICK, SR., OF PERTH, ONTARIO, CANADA.

SCOOTER-CAR.

1,389,633.  Specification of Letters Patent.  Patented Sept. 6, 1921.

Application filed October 11, 1920. Serial No. 416,225.

*To all whom it may concern:*

Be it known that I, JOHN DITTRICK, Senior, a subject of the King of Great Britain, a resident of the town of Perth, Province of Ontario, Dominion of Canada, have invented certain new and useful Improvements in Scooter-Cars, of which the following is a specification.

This invention relates to improvements in scooter cars, and the objects of the invention are to provide a simple and effective mechanism for propelling the same, and to design the scooter car to simple parts and adapt it to better perform the functions required of it, and it consists essentially of the improved construction hereinafter described in detail in the accompanying specification and drawings.

In the drawings:

Figure 1 is a perspective view of the scooter car.

Fig. 2 is a side elevation.

Fig. 3 is a front elevation.

Fig. 4 is a plan view.

Fig. 5 is a sectional detail showing the brake.

Like characters of reference indicate like parts in all the figures.

Referring to the drawings, A represents the seat portion which is supported at the rear by a pair of wheels 11 supported from a bracket 12, which bracket includes a board 13 extending transversely, and a brace 14 of triangular shape extending at right angles to the board 13.

The seat is supported at the front end from a single wheel 15 mounted on a steering post 16, the post being at a slight angle to the vertical and pivotally connected to the forward end of the seat, as by means of a bracket 17 on the steering post through which a pivoted bolt 18 extends and connects the bracket with the seat A. The upper part of the steering post is formed with a transversely extending handle 19.

The wheel 15 is driven by means of cranks 20 which are mounted in the bifurcated end of the steering post 16 and operatively connected to the wheel.

Connecting rods 22 extend from the cranks to hand cranks 23, which are mounted in the top of the steering post and are free to turn therein.

An imitation of a lamp or an actual lamp 24 may be provided on the top of the steering post.

25 represents foot supports extending rearwardly in an inclined direction from each side of the steering post and having cross pins 26 adapted to support the feet of the operator; foot guards 27 are provided mounted on the supports 25 in advance of the pins 26.

30 indicates a brake including an operating foot lever 31 adjacent to the guard 27 mounted on a rod 32 which is pivotally supported from the foot support 25. The rod carries a brake member 33 adapted to engage the periphery of the wheel 15 being normally held out of engagement therewith by a tension spring 34 which extends between the end of the member 33 and the steering post.

It will be seen that the scooter may be readily propelled by operating the hand crank 23, and when under way the feet of the child may be retained safely in position on the foot rests above described.

During the ordinary operation on the level or uphill, the scooter will be operated by the child through the cranks 23, but when it is desired to coast either on the level or down hill, the child's hands will be withdrawn from the cranks 23 and placed on the handle 19. This will leave the cranks 23 free to turn with the cranks 20 on the wheel 15 and the scooter may coast freely; its speed during coasting may be regulated by operation of the brake 30.

As many changes could be made in the above construction and many widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. A scooter car comprising a seat, a rolling rear support for the seat, a steering post pivotally connected to the seat, a wheel on the steering post, a crank connected to the wheel, a connecting rod extending from the crank, a hand crank connected to the upper end of the connecting rod, and a foot rest extending from the steering post, and a brake adapted to operate on the wheel, the said brake comprising a pivotally mounted rod, and a foot lever on the rod.

2. A scooter car comprising a seat, a rolling rear support for the seat, a steering post pivotally connected to the seat, a wheel on the steering post, a crank connected to the wheel, a connecting rod extending from the crank, a hand crank connected to the upper end of the connecting rod, and a foot rest extending from the steering post, and a brake adapted to operate on the wheel, the said brake comprising a pivotally mounted rod, and a foot lever on the rod, and a spring extending between the brake and the steering post.

3. A scooter car comprising a seat, wheels supporting the rear end of the seat, a steering post pivotally connected to the front end of the seat, a steering wheel mounted in the bottom of the steering post, cranks on opposite sides of the steering wheel, means for driving the cranks, a pair of inclined arms connected to the steering post above the steering wheel and below the seat and extending rearwardly and downwardly, laterally extending pins carried by the arm and forming foot rests, and rods mounted on the arm in advance of the pins and foot guards carried on the said rods.

In witness whereof I have hereunto set my hand in the presence of two witnesses.

JOHN DITTRICK, Sr.

Witnesses:
RUSSELL B. BONATT,
MARY E. KNOX.